US008954590B2

(12) United States Patent
Marchev et al.

(10) Patent No.: US 8,954,590 B2
(45) Date of Patent: Feb. 10, 2015

(54) TUNNELING APPARATUS AND METHOD FOR CLIENT-SERVER COMMUNICATION

(75) Inventors: Nikola I. Marchev, Sofia (BG); Miroslav R. Petrov, Sofia (BG); Biser E. Ivanov, Sofia (BG); Jasen S. Minov, Sofia (BG); Nikolai V. Neichev, Sofia (BG)

(73) Assignee: SAP AG, Walldorf (DE)

( * ) Notice: Subject to any disclaimer, the term of this patent is extended or adjusted under 35 U.S.C. 154(b) by 1931 days.

(21) Appl. No.: 10/833,807

(22) Filed: Apr. 27, 2004

(65) Prior Publication Data

US 2011/0276702 A1    Nov. 10, 2011

(51) Int. Cl.
*G06F 15/16* (2006.01)
*H04L 29/08* (2006.01)
*H04L 29/06* (2006.01)

(52) U.S. Cl.
CPC .............. *H04L 63/029* (2013.01); *H04L 69/32* (2013.01); *H04L 63/0876* (2013.01); *H04L 63/1458* (2013.01)
USPC ....................................................... 709/227

(58) Field of Classification Search
USPC ......................................... 709/201, 227–228
See application file for complete search history.

(56) References Cited

U.S. PATENT DOCUMENTS

| | | | | |
|---|---|---|---|---|
| 5,455,953 A | * | 10/1995 | Russell | 710/266 |
| 5,835,725 A | * | 11/1998 | Chiang et al. | 709/228 |
| 6,061,741 A | * | 5/2000 | Murphy et al. | 709/248 |
| 6,212,640 B1 | * | 4/2001 | Abdelnur et al. | 726/2 |
| 7,100,200 B2 | * | 8/2006 | Pope et al. | 726/10 |
| 7,171,473 B1 | * | 1/2007 | Eftis et al. | 709/227 |
| 7,313,618 B2 | * | 12/2007 | Braemer et al. | 709/225 |
| 7,502,726 B2 | * | 3/2009 | Panasyuk et al. | 703/22 |
| 7,502,838 B2 | * | 3/2009 | Franco et al. | 709/219 |
| 2002/0156901 A1 | * | 10/2002 | Erickson et al. | 709/227 |
| 2002/0169980 A1 | * | 11/2002 | Brownell | 713/201 |
| 2003/0145232 A1 | * | 7/2003 | Poletto et al. | 713/201 |
| 2003/0154239 A1 | * | 8/2003 | Davis et al. | 709/201 |
| 2003/0154306 A1 | * | 8/2003 | Perry | 709/245 |
| 2003/0188001 A1 | * | 10/2003 | Eisenberg et al. | 709/229 |
| 2004/0264371 A1 | * | 12/2004 | Chen | 370/229 |
| 2006/0161771 A1 | * | 7/2006 | Zhang | 713/168 |

OTHER PUBLICATIONS

Jeffrey C. Mogul, The Case for Persistent-Connection HTTP, 1995, ACM SIGCOMM Computer Communication Review, vol. 25, pp. 299-313.*

Sun Microsystems, RMI Wire Protocol, 1996, pp. 1-9.*

* cited by examiner

*Primary Examiner* — Esther Benoit
(74) *Attorney, Agent, or Firm* — Schwegman Lundberg & Woessner, P.A.

(57) ABSTRACT

An HTTP tunneling service is described for creating a tunneled path between a client and a server (e.g., over a firewall or other data/protocol filtering device). According to one embodiment of the invention the client sends the server an initial request to open a preliminary socket connection which includes a secure client ID previously assigned to the client. The server opens the preliminary socket connection, generates a random client ID and transmits the random client ID to the client. The preliminary socket connection is then closed. The client then sends a second request to open a second socket connection using both the unique ID and the secure client ID for authentication purposes.

26 Claims, 5 Drawing Sheets

TUNNELING APPARATUS AND METHOD FOR CLIENT-SERVER COMMUNICATION

BACKGROUND

1. Field of the Invention

This invention relates generally to the field of data processing systems. More particularly, the invention relates to a system and method for providing remote client access to servers using by tunneling a first protocol within a second protocol.

2. Description of the Related Art

Firewalls and proxy servers are essential components of any corporate network. Although these devices are helpful in preventing unauthorized access to the corporate network, they are difficult to configure, and often prevent network access by legitimate clients.

One well known technique used to gain access through corporate firewalls is "tunneling" via the HyperText Transport Protocol ("HTTP") (commonly referred to as "HTTP tunneling"). Because HTTP is the communication protocol used to request and receive Web pages from the World Wide Web ("the Web"), most system administrators configure their corporate firewalls to allow HTTP traffic through. Thus, by encapsulating other protocols within an HTTP data stream, the other protocols may be "tunneled" through the firewall to a destination (or from a source) on the corporate network.

This concept is illustrated graphically in FIG. 1a which shows a protocol stack 100 including Ethernet at the physical/media access control ("MAC") layer 104; Transmission Control Protocol/Internet Protocol ("TCP/IP") at the network/transport layers 103; HTTP at the "application" layer 102; and a tunneled protocol 101 encapsulated within HTTP. Various types of protocols may be tunneled in this manner including object-oriented business protocols such as the common object request broker architecture ("CORBA") and remote method invocation ("RMI").

HTTP is a stateless request/response protocol. As illustrated in FIG. 1b, an HTTP request initiated by a client 102 opens a socket connection 104 with a Web server 106. The Web server 106 parses the request, extracts the tunneled protocol, and provides the tunneled protocol to a server-side application 107. In a Java 2 Enterprise Edition ("J2EE") environment, for example, the server side application may be based on Enterprise Java Beans ("EJB") and the tunneled protocol may be RMI. The server-side application 107 generates a response to the request, which the Web server encapsulates in an HTTP response to the client 102. The server then closes the socket connection 104.

One problem which exists with the foregoing configuration is that, due to the limitations of the HTTP protocol, the Web server 106 is not capable of transmitting data to a client unless the client first sends the server an HTTP request. As a result, even though a tunneled protocol such as RMI may inherently provide for continuous bi-directional communication between a server and a client, this level of communication is prevented when HTTP tunneling is used to bypass a firewall/proxy server.

Accordingly, what is needed is an improved mechanism for HTTP tunneling, which supports continuous bi-directional communication between a server and a client. What is also needed is an improved tunneling mechanism that provides for a high level of security.

SUMMARY

An HTTP tunneling service is described for creating a tunneled path between a client and a server (e.g., over a firewall or other data/protocol filtering device). According to one embodiment of the invention the client sends the server an initial request to open a preliminary socket connection which includes a secure client ID previously assigned to the client. The server opens the preliminary socket connection, generates a random client ID and transmits the random client ID to the client. The preliminary socket connection is then closed. The client then sends a second request to open a second socket connection using both the unique ID and the secure client ID for authentication purposes. The second socket connection is opened and is left open so that the server can send continuous updates to the client. A "tunneling" protocol such as HTTP is used to transmit a "tunneled" protocol such as RMI through the open socket connection.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing a tunneled communication channel between a client and a server. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Exemplary Network Architecture

Figure 1A:
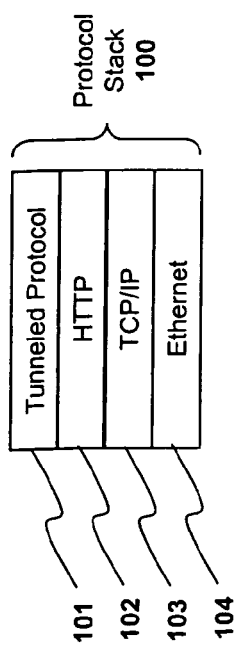
FIG. 1a illustrates a prior art protocol stack used for tunneling via the HTTP protocol.
Figure 1B:
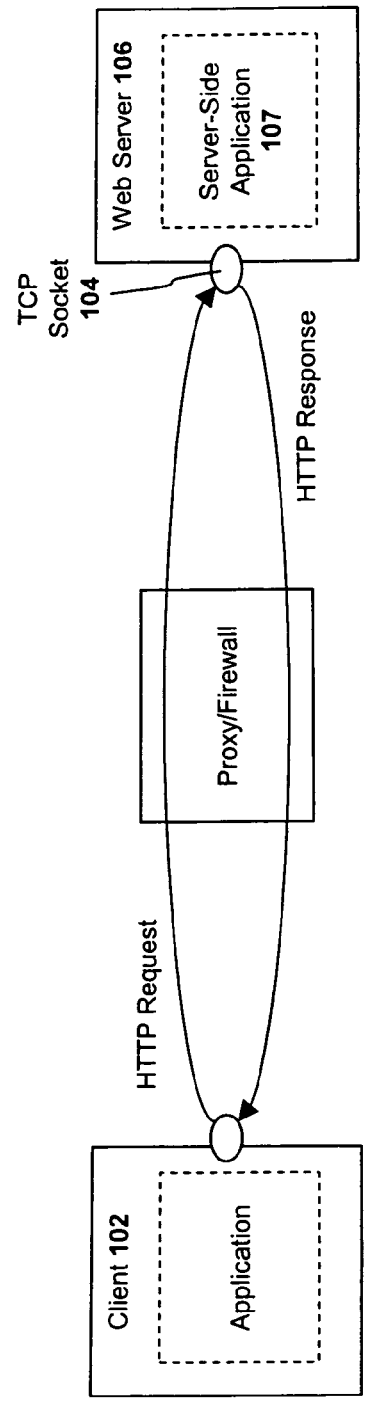
FIG. 1b illustrates a prior art client-server architecture for communicating via the HTTP protocol.
Figure 2:
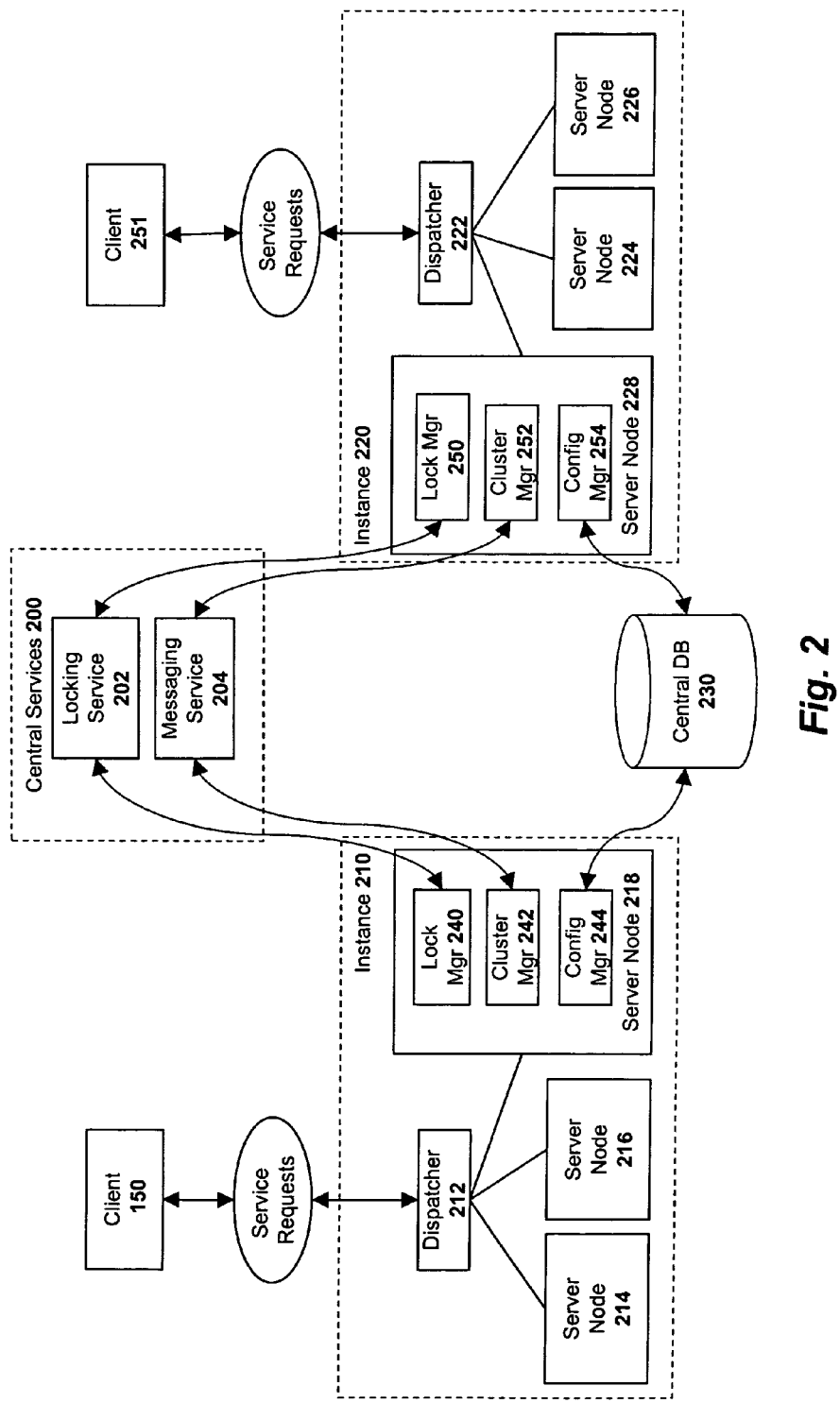
FIG. 2 illustrates a network architecture employed in one embodiment of the invention.

A system architecture according to one embodiment of the invention is illustrated in FIG. 2. The architecture includes a central services instance 200 and a plurality of application server instances 210, 220. As used herein, the application server instances, 210 and 220, each include a group of server nodes 214, 216, 218 and 224, 226, 228, respectively, and a dispatcher, 212, 222, respectively. The central services instance 200 includes a locking service 202 and a messaging service 204 (described below). The combination of all of the application instances 210, 220 and the central services instance 200 is referred to herein as a "cluster." Although the following description will focus solely on instance 210 for the purpose of explanation, the same principles apply to other instances such as instance 220.

The server nodes 214, 216, 218 within instance 210 provide the business and/or presentation logic for the network applications supported by the system. Each of the server nodes 214, 216, 218 within a particular instance 210 may be configured with a redundant set of application logic and associated data. In one embodiment, the dispatcher 210 distributes service requests from clients to one or more of the server nodes 214, 216, 218 based on the load on each of the servers. For example, in one embodiment, the dispatcher 210 implements a round-robin policy of distributing service requests.

The server nodes 214, 216, 218 may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 210, 220 is enabled via the central services instance 200. As illustrated in FIG. 2, the central services instance 200 includes a messaging service 204 and a locking service 202. The message service 204 allows each of the servers within each of the instances to communicate with one another via a message passing protocol. For example, messages from one server may be broadcast to all other servers within the cluster via the messaging service 204 (e.g., such as the cache configuration messages described below). Alternatively, messages may be addressed directly to specific servers within the cluster (i.e., rather than being broadcast to all servers).

In one embodiment, the locking service 202 disables access to (i.e., locks) certain specified portions of configuration data and/or program code stored within a central database 230. The locking manager locks data on behalf of various system components which need to synchronize access to specific types of data and program code (e.g., such as the configuration managers 244, 254 illustrated in FIG. 2). In one embodiment, the locking service enables a distributed caching architecture in which copies of configuration data are cached locally at servers/dispatchers.

In one embodiment, the messaging service 204 and the locking service 202 are each implemented on dedicated servers. However, the messaging service 204 and the locking service 202 may be implemented on a single server or across multiple servers while still complying with the underlying principles of the invention.

As illustrated in FIG. 2, each server node (e.g., 218, 228) includes a lock manager 240, 250 for communicating with the locking service 202; a cluster manager 242, 252 for communicating with the messaging service 204; and a configuration manager 244, 254 for communicating with a central database 230 (e.g., to store/retrieve configuration data as described herein). Although the lock manager 240, 250, cluster manager 242, 252 and configuration manager 244, 254 are illustrated only with respect to server nodes 218 and 228 in FIG. 2, each of the server nodes 214, 216, 224 and 226 and/or on the dispatchers 212, 222 may be equipped with equivalent lock managers, cluster managers and configuration managers.

Embodiments of a Tunneling Service

Figure 3:
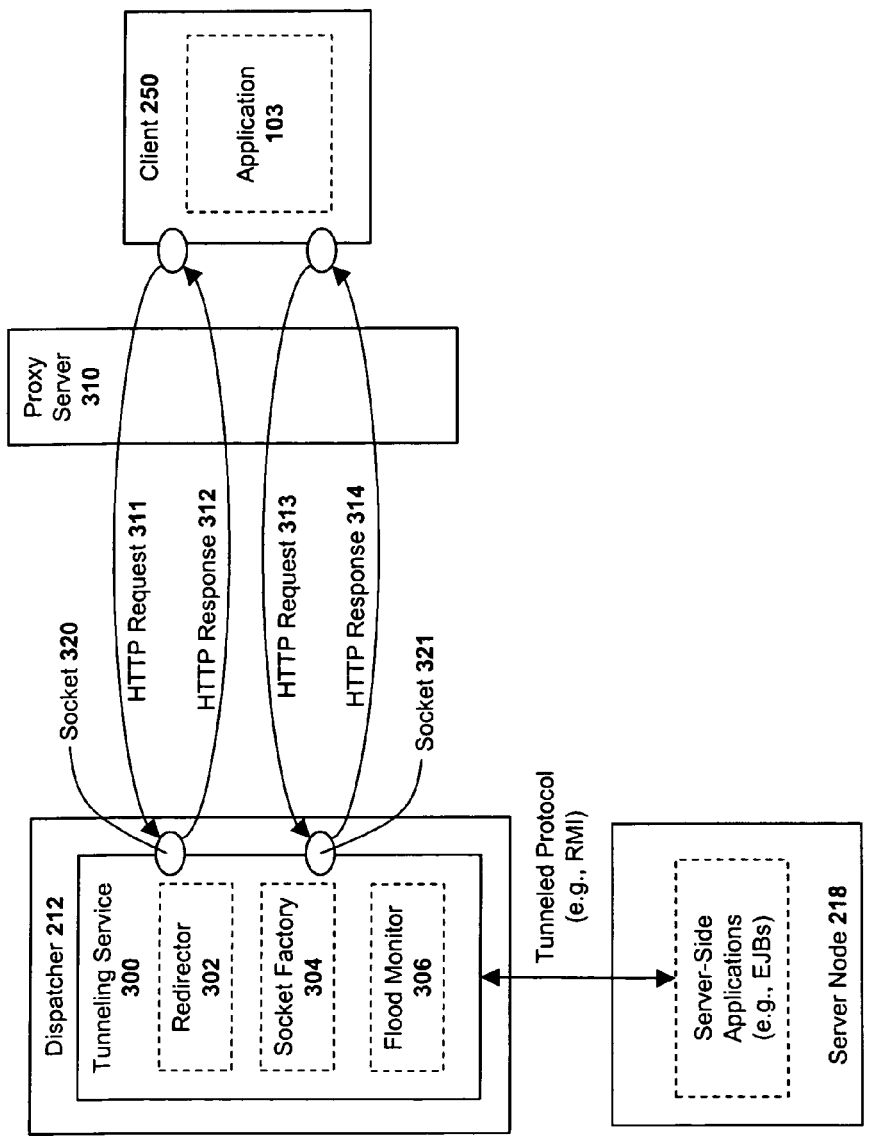
FIG. 3 illustrates a tunneling architecture employed in one embodiment the invention.

FIG. 3 illustrates one embodiment of the invention comprising a tunneling service 300 which provides clients 250 with remote access to server nodes 218 through firewalls/proxy servers 310 (and/or other types of devices used to filter data traffic). In order to establish and maintain a communication session with the client 250, one embodiment of the tunneling service employs two separate socket connections: a first socket connection 320 which is used for receiving messages from the client 250; and a second socket connection 321 which is used to actively transmit messages to the client.

Figure 4:
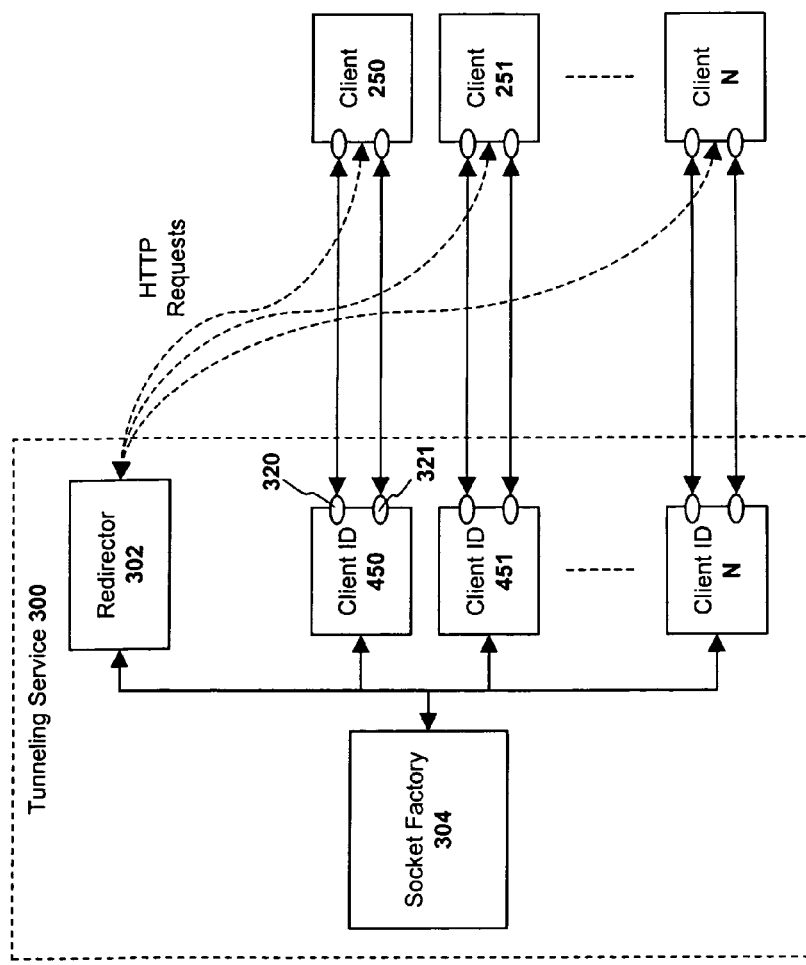
FIG. 4 illustrates additional details of the tunneling architecture according to one embodiment.

As illustrated in FIG. 4, each socket is generated by a socket factory module 304 (e.g., in response to a "GetSocket" request transmitted from a client). The sockets are associated with a different clients IDs 450, 451, N, identifying different clients 250, 251, N, respectively. As described in greater detail below, in one embodiment, the client IDs 450, 451, N are a combination of a "secure client ID" assigned to the client and a "random client ID" generated dynamically by the tunneling service 300.

In one embodiment, a thread process referred to herein as a server redirector 302 is executed to continually monitor client requests. When a particular client sends a HTTP request (e.g., request 311) to the tunneling service 300, the server redirector 302 redirects the request to the appropriate socket connection (e.g., socket 320) using the client ID contained in the client's message.

Figure 5:
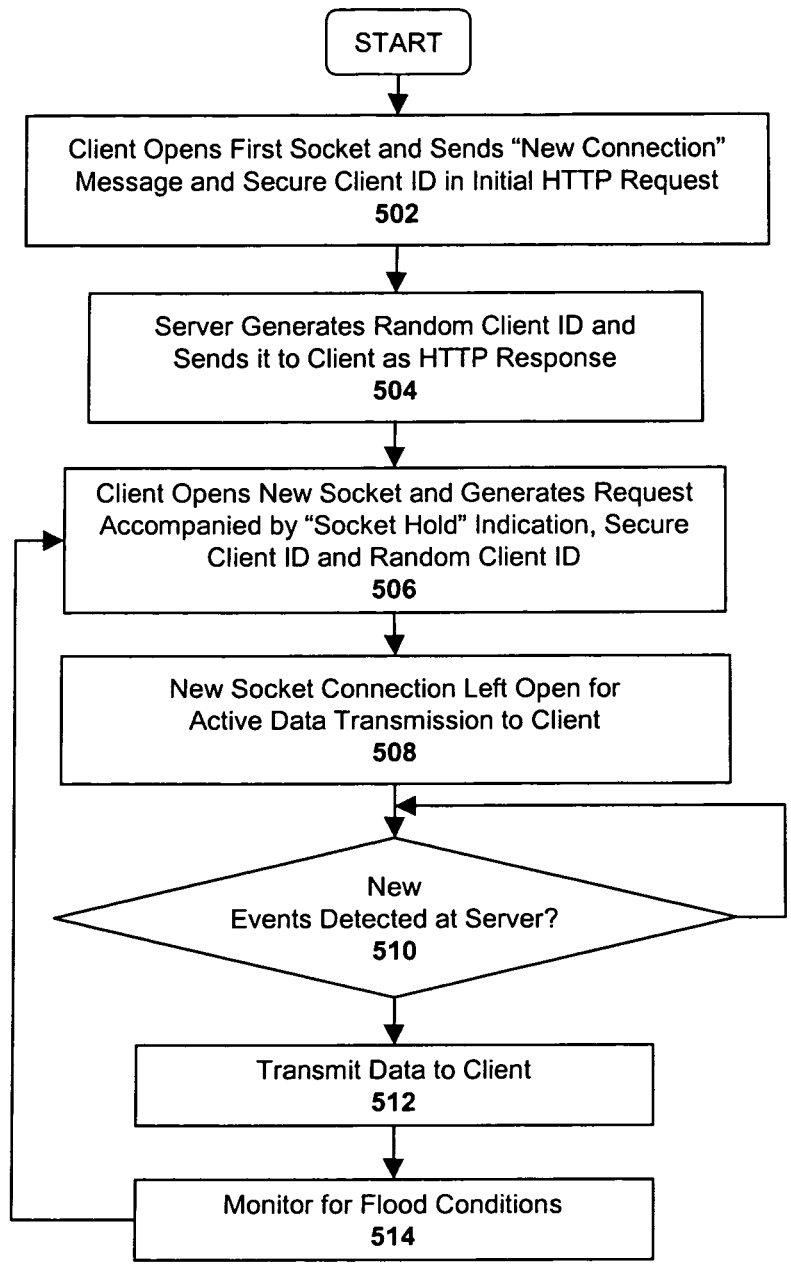
FIG. 5 illustrates a method employed in one embodiment of the invention.

One particular embodiment of a method for establishing secure client-server communication on the architecture shown in FIGS. 3-4 is illustrated in FIG. 5. At 502, the client 250 opens a first socket connection 320 by transmitting an HTTP request 311 that includes a "New Connection" indication and a "secure client ID." A different secure client ID is associated with each client authorized to access the tunneling service 300. In one embodiment, the New Connection indication and a secure client ID are embedded within the header of the HTTP request 311. The New Connection message may include an "HTTP tunneling" variable which indicates that the client is requesting an HTTP tunneling session, rather than a standard HTTP session (e.g., in the form of GetSocket ("httptunneling")). It should be noted, however, that the underlying principles of the invention are not limited to any particular type of HTTP header variables.

At 504, if the client requests HTTP tunneling, client ID generation logic (not shown) within the tunneling service 300 dynamically generates a unique client ID (i.e., in addition to the "secure" client ID) and transmits the unique client ID to the client in the form of an HTTP response 312. In one embodiment, the unique client ID is randomly generated (hereinafter "random client ID"). However, other mechanisms may be employed to dynamically generate a unique ID for the client. The tunneling service 300 stores the unique and/or random client ID with the secure client ID and maintains an association between the unique/random client ID, secure client ID and the client 250. As a result of the HTTP response 312, the first socket 320 is closed.

At 506, the client 250 transmits a second HTTP request 313 to the tunneling service which contains the secure client ID and the unique/random client ID previously generated by the tunneling service. In effect, the secure client ID and the unique/random client ID are combined to form a single, more secure client ID code. In one embodiment, the redirector 302 opens the second socket 321 in response to the HTTP request, using both the secure client ID and the unique/random client ID to identify the client. In one embodiment, the second HTTP request 313 also includes a "Hold" indication within the HTTP header, which instructs the tunneling service 300 to leave the second socket 321 open. Accordingly, at 508, the second socket 321 is left open, thereby allowing the client 250 to receive continuous updates in response to certain specified events at the server node 218 (detected at 510 in FIG. 5).

Various different types of events trigger the tunneling service to provide updates to the client at 512. For example, if a value of a particular resource on server node 218 rises above or falls below a specified threshold value, this event may cause the tunneling service to actively notify the client 250. In one embodiment, a Java Management Extensions ("JMX") architecture is employed to monitor resources within the server node 218 (and within other servers and dispatchers of the cluster). According to the JMX architecture, a specific type of bean known as a management bean ("MBean") is employed to monitor different resources within the system. The management beans may be configured to generate active notifications to the tunneling service 300 in response to changes in the resources that they monitor. For example, if a particular resource is disabled, the MBean associated with that resource may provide a notification to the client 250 via the open socket connection 314 on the tunneling service 300. It should be noted, however, that the underlying principles of the invention are not limited to any particular monitoring/management software architecture.

In addition, in one embodiment, the client 250 may be a graphical network administration client which provides a comprehensive graphical representation of the different resources on different servers and dispatchers of the cluster. Using the client 250 in combination with the HTTP tunneling techniques described herein, network administrators may remotely manage the resources through a firewall/proxy server 310 and receive continuous updates via the management network architecture.

Leaving an open socket connection 321 as described above expose the system to certain types of attacks from computer hackers. For example, with an open socket, a hacker may flood the system with extremely large HTTP requests (e.g., HTTP headers can be as large as 10 Mbytes in size).

To provide additional security against these types of attacks, one embodiment of the invention includes a flood monitor module 306 to monitor HTTP requests received by the system and take steps to ensure that one of the sockets does not become flooded with HTTP traffic. For example, in one embodiment, if amount of HTTP data for a particular HTTP request rises above a specified threshold value (e.g., 2 MBytes), the flood monitor module 306 will break the connection and close the offending socket. Alternatively, or in addition, in one embodiment, the flood monitor module 306 buffers the HTTP traffic in blocks of a specified size and does not allow any additional traffic until the current block has been consumed. This way, only a maximum specified amount of HTTP data may be stored for each open socket at any given time, making it more difficult to flood the system with HTTP requests.

In addition to the HTTP tunneling security measures described above, HTTP layer security may be employed such as HTTP Secure ("HTTPS"). Using HTTPS instead of HTTP directs the message to a secure port number rather than the default Web port number of 80. The session may also be managed by other security protocols such as the secure sockets layer protocol ("SSL") and IP security protocol ("IPSec").

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

For example, while the embodiments of the invention described above describe HTTP as the "tunneling" protocol and RMI as the "tunneled" protocol, various other types of tunneling protocols and tunneled protocols may be used while still complying with the underlying principles of the invention including, by way of example, the Distributed Component Object Model ("DCOM") and the common object request broker ("CORBA") as tunneled protocols.

Moreover, although the embodiments of the invention described above focus on a JMX implementation within a J2EE environment, the underlying principles of the invention are not limited to any particular software architecture or specification. For example, the invention may be implemented within the context of other object-oriented and non-object-oriented programming environments, and may also be employed within future releases of the Java standard, or other standards (e.g., Microsoft's .NET standard).

Accordingly, the scope and spirit of the invention should be judged in terms of the claims which follow.

What is claimed is:

1. A method comprising:
receiving over a first socket connection from a client a first request formatted according to a first protocol to open a new socket connection to tunnel communication according to a second protocol, the first request also including a secure client ID associated with the client, the secure client ID comprising an identifier identifying the client and assigned to the client prior to receiving the first request;
dynamically generating a unique client ID in response to the first request;
sending a response including the unique client ID to the client through the first socket connection;
closing the first socket connection in response to the response being sent to the client;
opening a second socket connection between the client and the server node;
receiving, over the second socket connection from the client, the secure client ID and the unique client ID;
receiving a second request from the client, the second request indicating that a second socket connection is to be left open;

combining the secure client ID and the unique client ID to form a single secure ID code;
identifying the client based on the single secure ID code;
leaving the second socket connection open responsive to the second request to allow unsolicited communication to the client over the second socket connection;
encapsulating one or more unsolicited items anew information within the second protocol; and
transmitting the encapsulated one or more unsolicited items of new information to the client over the second socket connection via the first protocol.

2. The method as in claim 1 wherein generating the unique client ID comprises generating a random client ID.

3. The method as in claim 1 wherein:
identifying the client based on the unique client ID comprises identifying the client based on both the unique client ID and the secure client ID.

4. The method as in claim 1 further comprising:
monitoring the second socket connection for one or more specified data flood conditions, wherein, in response to detecting the one or more data flood conditions, closing the second socket connection.

5. The method as in claim 1 wherein the first protocol is the hypertext transport protocol ("HTTP").

6. The method as in claim 1 further comprising:
providing one or more data updates to the client over the second socket connection,
wherein the data updates comprise a remote method invocation and/or the results of the remote method invocation ("RMI").

7. A system comprising:
a cluster of servers to provide server side processing for a plurality of clients, each server comprising at least one processor and memory;
a tunneling service executed on one or more of the servers, the tunneling service to receive a first request from a client over a first socket connection, the first request formatted according to a first protocol, the first request requesting a new connection, the new connection to tunnel communication according to a second protocol, the tunneling service comprising client ID generation logic to:
provide a secure client ID to the client before the client generates the first request, the first request including the secure client ID, the secure client ID comprising an identifier identifying the client;
dynamically generate a unique client ID in response to a the first client request, the tunneling service providing the unique client ID to the requesting client with a message sent through a first socket connection between the client and the tunneling service that was created in response to said tunneling service's reception of said first request;
close the first socket connection in response to the message being sent to the client;
wherein the tunneling service opens a second socket connection between the client and the tunneling server, receives over the second socket connection from the client, the secure client ID and the unique client ID, receives a second request from the client the second client request indicating the second socket connection is to be left open, combines the secure client ID and the unique client ID to form a single secure ID code, identify the client based on the single secure ID code; and
wherein the tunneling service leaves the second socket connection open to allow unsolicited communication to the client over the second socket connection, and to provide one or more data updates to the client over the second socket connection.

8. The system as in claim 7 wherein the client ID generation logic comprises random number generation logic to generate the unique client ID.

9. The system as in claim 7 wherein the client is identified based on both the unique client ID and the secure client ID.

10. The system as in claim 7 wherein the tunneling service is to:
monitor the second socket connection for one or more specified data flood conditions wherein, in response to detecting the one or more data flood conditions, the flood monitor module closes the second socket connection; and/or
limit data communicated through the second socket connection to a block of a threshold size prior to allowing any additional data to be communicated through the second socket connection to prevent data flooding conditions.

11. The system as in claim 7 wherein the tunneling service encapsulates one or more data updates within the second protocol prior to sending the data updates over the second socket connection with the first protocol.

12. The system as in claim 11 wherein the first protocol is the hypertext transport protocol ("HTTP").

13. The system as in claim 12 wherein the second protocol is a remote method invocation and/or the results of the remote method invocation ("RMI").

14. The system as in claim 7 wherein the tunneling service is to monitor the second socket connection for one or more specified data flood conditions.

15. The system as in claim 14 wherein, in response to detecting the one or more data flood conditions, the tunneling service closes the second socket connection.

16. The system as in claim 7 wherein the tunneling service is to limit data communicated through the second socket connection to a block of a threshold size prior to allowing any additional data to be communicated through the second socket connection to prevent data flooding conditions.

17. An article of manufacture which comprises a non-transitory computer-readable medium for storing program code which, when executed by a computer, causes the computer to perform the operations of:
receiving a first request from a client over a first socket connection, the first request formatted according to a first protocol, the first request requesting a new connection, the new connection to tunnel communication according to a second protocol, the first request also including a secure client ID that was provided to the client beforehand, the secure client ID comprising an identifier identifying the client;
dynamically generating a unique client ID in response to the first request;
incorporating the unique client ID in a response to the first request, sending the response to the client through the first socket connection and closing the first socket connection in response to the sending of the response;
opening a second socket connection between the client and the server node;
receiving over the second socket connection from the client, the secure client ID and the unique client ID;
receiving a second request from the client indicating that the second socket connection is to be left open;

combining the secure client ID and the unique client ID to form a single secure ID code;
identifying the client based on the single secure ID code
leaving a second socket connection open to allow unsolicited communication to the client over the second socket connection; and
providing one or more data updates to the client over the second socket connection.

18. The article of manufacture as in claim 17 wherein generating the unique client ID) comprises generating a random client ID.

19. The article of manufacture as in claim 17 comprising additional program code to cause the computer to perform the operations of:
identifying the client based on both the unique client ID and the secure client ID.

20. The article of manufacture as in claim 17 wherein generating the operations further comprise:
monitoring the second socket connection for one or more specified data flood conditions, wherein, in response to detecting the one or more data flood conditions, closing the second socket connection; and
in addition to or in lieu of monitoring the second socket connection, limiting data communicated through the socket connection to a block of a threshold size prior to allowing any additional data to be communicated through the second socket connection to prevent data flooding conditions.

21. The article of manufacture as in claim 17 comprising additional program code to cause the computer to perform the operations of:
encapsulating the data updates within the second tunneling protocol; and
transmitting the data updates through the second socket connection via the first protocol.

22. The article of manufacture as in claim 21 wherein the first protocol is the hypertext transport protocol ("HTTP").

23. The article of manufacture as in claim 22 further comprising:
providing one or more data updates to the client over the second socket connection,
wherein the data updates comprise a remote method invocation and/or the results of the remote method invocation ("RMI").

24. The article of manufacture as in claim 17 further comprising:
monitoring the second open socket connection for one or more specified data flood conditions.

25. The article of manufacture as in claim 24 wherein, in response to detecting the one or more data flood conditions, closing the second socket connection.

26. The article of manufacture as in claim 17 comprising additional instructions to cause the computer to perform the operations of:
limiting data communicated through the second socket connection to a block of a threshold size prior to allowing any additional data to be communicated through the second socket connection to prevent data flooding conditions.

* * * * *